(12) United States Patent
Hirosawa (10) Patent No.: US 10,877,320 B2
(45) Date of Patent: Dec. 29, 2020

(54) DISPLAY DEVICE

(71) Applicant: Japan Display Inc., Minato-ku (JP)

(72) Inventor: Jin Hirosawa, Tokyo (JP)

(73) Assignee: Japan Display Inc., Minato (JP)

( * ) Notice: Subject to any disclaimer, the term of this patent is extended or adjusted under 35 U.S.C. 154(b) by 197 days.

(21) Appl. No.: 16/122,430

(22) Filed: Sep. 5, 2018

(65) Prior Publication Data

US 2019/0072794 A1 Mar. 7, 2019

(30) Foreign Application Priority Data

Sep. 5, 2017 (JP) .................................. 2017-170532

(51) Int. Cl.
*G02F 1/1339* (2006.01)
*G02F 1/1333* (2006.01)
*G02F 1/1343* (2006.01)

(52) U.S. Cl.
CPC .... *G02F 1/13394* (2013.01); *G02F 1/133345* (2013.01); *G02F 2001/13396* (2013.01); *G02F 2001/134318* (2013.01)

(58) Field of Classification Search
CPC .......... G02F 1/13394; G02F 1/133711; G02F 1/136286; G02F 1/133345; G02F 2001/134318; G02F 2001/13396; G02F 1/13436
See application file for complete search history.

(56) References Cited

U.S. PATENT DOCUMENTS

| | | | |
|---|---|---|---|
| 2001/0038429 A1* | 11/2001 | Baek | G02F 1/134336 349/113 |
| 2013/0342795 A1 | 12/2013 | Park et al. | |
| 2017/0097532 A1* | 4/2017 | Tang | G02F 1/13394 |

FOREIGN PATENT DOCUMENTS

JP 2014-2385 1/2014

* cited by examiner

*Primary Examiner* — Phu Vu
(74) *Attorney, Agent, or Firm* — Oblon, McClelland, Maier & Neustadt, L.L.P.

(57) ABSTRACT

According to one embodiment, a display device includes a first substrate including a first relay electrode, a second relay electrode, and a first insulating layer including a first contact hole penetrated to the first relay electrode and a second contact hole penetrated to the second relay electrode, a second substrate opposed to the first substrate, and a main spacer located between the first substrate and the second substrate, the first insulating layer further including a first concavity located between the first contact hole and the second contact hole, the main spacer being located in the first concavity, and maintaining a cell gap between the first substrate and the second substrate.

19 Claims, 10 Drawing Sheets

DISPLAY DEVICE

CROSS-REFERENCE TO RELATED APPLICATIONS

This application is based upon and claims the benefit of priority from Japanese Patent Application No. 2017-170532, filed Sep. 5, 2017, the entire contents of which are incorporated herein by reference.

FIELD

Embodiments described herein relate generally to a display device.

BACKGROUND

A liquid crystal display device comprises a spacer for forming a predetermined gap between a pair of substrates, for example. When a pressure force is applied to the substrate from outside, as a result of displacement of the spacer, an alignment film may be damaged, and alignment defect of liquid crystal molecules may occur. Accordingly, a technology of providing a device in which a light-shielding layer overlapping spacers is larger than that of a light-shielding layer not overlapping the spacers has been known, as measures against light leakage caused by the alignment defect around the spacers.

DETAILED DESCRIPTION

In general, according to one embodiment, a display device includes: a first substrate including a first relay electrode, a second relay electrode, and a first insulating layer including a first contact hole penetrated to the first relay electrode and a second contact hole penetrated to the second relay electrode; a second substrate opposed to the first substrate; and a main spacer located between the first substrate and the second substrate, the first insulating layer further including a first concavity located between the first contact hole and the second contact hole, the main spacer being located in the first concavity, and maintaining a cell gap between the first substrate and the second substrate.

According to another embodiment, a display device includes: a first substrate including an organic insulating layer including a first concavity and a second concavity; a second substrate opposed to the first substrate; a main spacer, which is provided on the second substrate, is located in the first concavity, and maintains a cell gap between the first substrate and the second substrate; and a sub-spacer, which is provided on the second substrate, is opposed to the second concavity, and is separated from the first substrate.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, structural elements, which have functions identical or similar to the functions described in connection with the preceding drawings, are denoted by the same reference numbers, and duplicated detailed explanation of those structural elements may be arbitrarily omitted.

Figure 1:
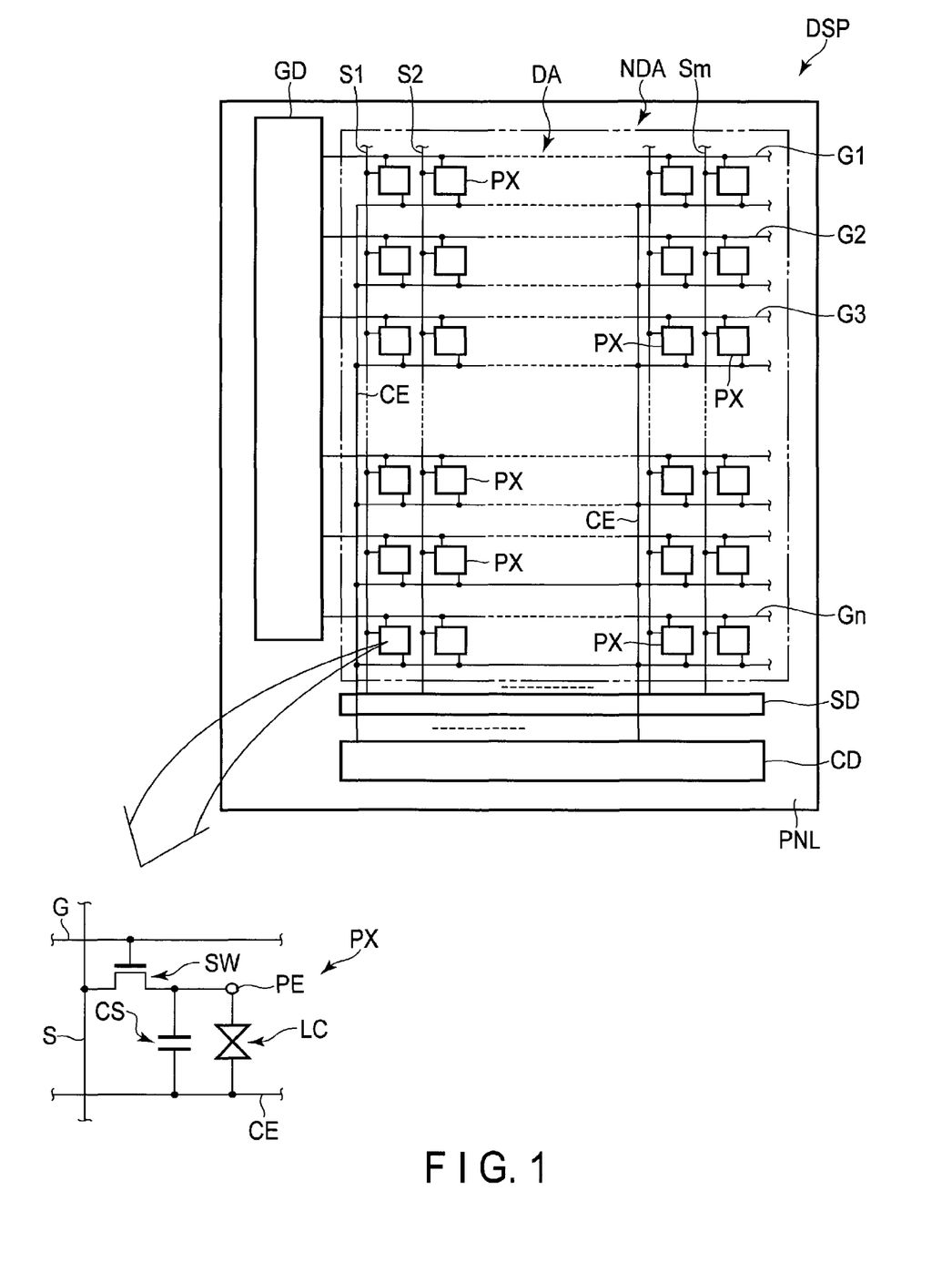
FIG. 1 is a view showing the structure of a display device DSP of the present embodiment.

FIG. 1 is a view showing the structure of a display device DSP of the present embodiment. The display device DSP includes a display panel PNL, etc. The display panel PNL is, for example, a liquid crystal display panel. The display panel PNL includes a display area DA in which an image is displayed, and a frame-shaped non-display area NDA surrounding the display area DA. The display panel PNL includes pixels PX in the display area DA. The pixels PX are arrayed in a matrix. Also, the display panel PNL includes scanning lines G (G1 to Gn), signal lines S (S1 to Sm), a common electrode CE, etc., in the display area DA. The scanning lines G are each connected to a scanning line drive circuit GD. The signal lines S are each connected to a signal line drive circuit SD. The common electrode CE is arranged over the pixels PX, and is connected to a common electrode drive circuit CD.

Each of the pixels PX comprises a switching element SW, a pixel electrode PE, the common electrode CE, a liquid crystal layer LC, and the like. The switching element SW is constituted by a thin-film transistor (TFT), for example, and is electrically connected to the scanning line G and the signal line S. The pixel electrode PE is electrically connected to the switching element SW. Each pixel electrode PE is opposed to the common electrode CE, and drives the liquid crystal layer LC by an electric field produced between the pixel electrode PE and the common electrode CE. A storage capacitance CS is formed between, for example, an electrode having the same potential as that of the common electrode CE and an electrode having the same potential as that of the pixel electrode PE.

Figure 2:
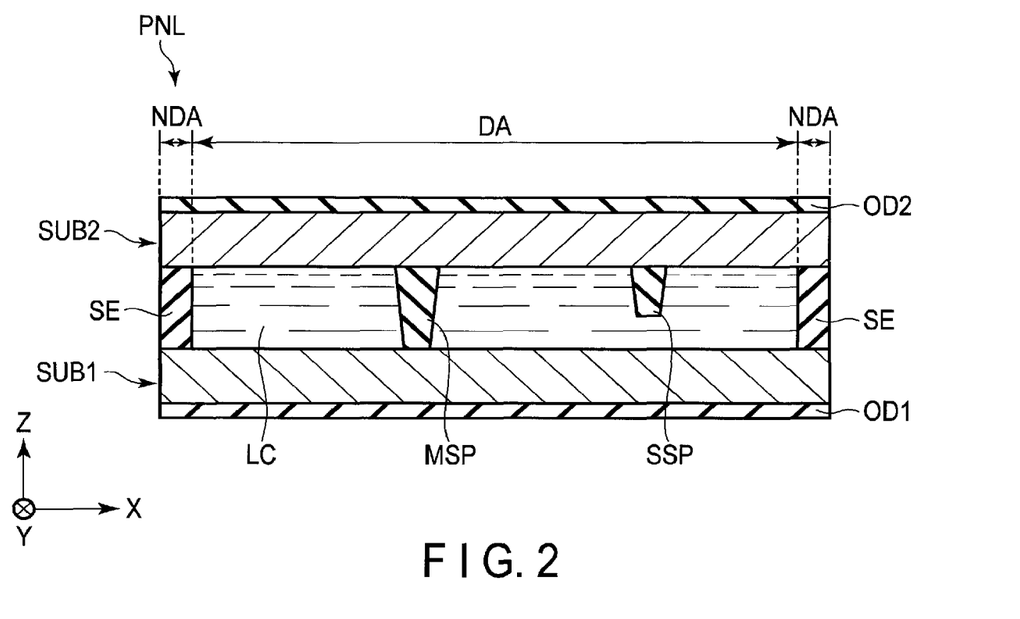
FIG. 2 is a cross-sectional view showing the structure of a display panel PNL in a display area DA.

FIG. 2 is a cross-sectional view showing the structure of the display panel PNL in the display area DA. In the drawing, a first direction X and a second direction Y intersect each other, and a third direction Z intersects the first direction X and the second direction Y. In one example, while the first direction X, the second direction Y, and the third direction Z are orthogonal to one another, they may cross one another at an angle other than ninety degrees. In the present specification, a direction toward a pointing end of an arrow indicating the third direction Z is referred to as upper, and a direction toward the opposite side from the pointing end of the arrow is referred to as lower. When such expressions as "a second member above a first member" and "a second member below a first member" are used, the second member may be in contact with the first member or may be separated from the first member. Further, it is assumed that an observation position at which the display device DSP is to be observed is at the pointing end side of the arrow indicating the third direction Z, and viewing from the observation position toward an X-Y plane defined by the first direction X and the second direction Y is called a planar view.

The display panel PNL comprises a first substrate SUB1, a second substrate SUB2, a main spacer MSP, a sub-spacer SSP, a sealant SE, the liquid crystal layer LC, an optical element OD1, and an optical element OD2. The second substrate SUB2 is opposed to the first substrate SUB1. The main spacer MSP and the sub-spacer SSP are located between the first substrate SUB1 and the second substrate SUB2. The main spacer MSP is in contact with the first substrate SUB1 and the second substrate SUB2, and maintains a cell gap between the first substrate SUB1 and the second substrate SUB2. The sub-spacer SSP is in contact with one of the first substrate SUB1 and the second substrate SUB2, and is separated from the other one of those substrates. In the example illustrated, the sub-spacer SSP is separated from the first substrate SUB1, and is in contact with the second substrate SUB2. Note that the main spacer MSP and the sub-spacer SSP may be provided on the first substrate SUB1, instead of being provided on the second substrate SUB2 as in the example illustrated, or the main spacer MSP and the sub-spacer SSP may be provided on separate substrates. Alternatively, the sub-spacer SSP may be omitted. The sealant SE is disposed in the non-display area NDA, and SUB2 to each other with the cell gap being formed. The liquid crystal layer LC is held between the first substrate SUB1 and the second substrate SUB2. The optical element OD1 is arranged on a side opposite to a side of the first substrate SUB1 that is in contact with the liquid crystal layer LC. The optical element OD2 is arranged on a side opposite to a side of the second substrate SUB2 that is in contact with the liquid crystal layer LC.

Further, the details of the configuration of the display panel PNL are not explained here, but the display panel PNL may have a configuration corresponding to any one of a display mode using a longitudinal electric field produced along the normal of the main surface of the substrate, a display mode using an inclined electric field which is tilted obliquely with respect to the main surface of the substrate, a display mode using a lateral electric field produced along the main surface of the substrate, and a display mode using an appropriate combination of the longitudinal electric field, the lateral electric field, and the inclined electric field. The main surface of the substrate is a surface parallel to the X-Y plane defined by the first direction X and the second direction Y.

The display panel PNL of the present embodiment may be a transmissive display panel having a transmissive display function of displaying an image by selectively transmitting light from a rear surface of the first substrate SUB1, a reflective display panel having a reflective display function of displaying an image by selectively reflecting light from a front surface of the second substrate SUB2, or a transflective display panel having the transmissive display function and the reflective display function.

Figure 3:
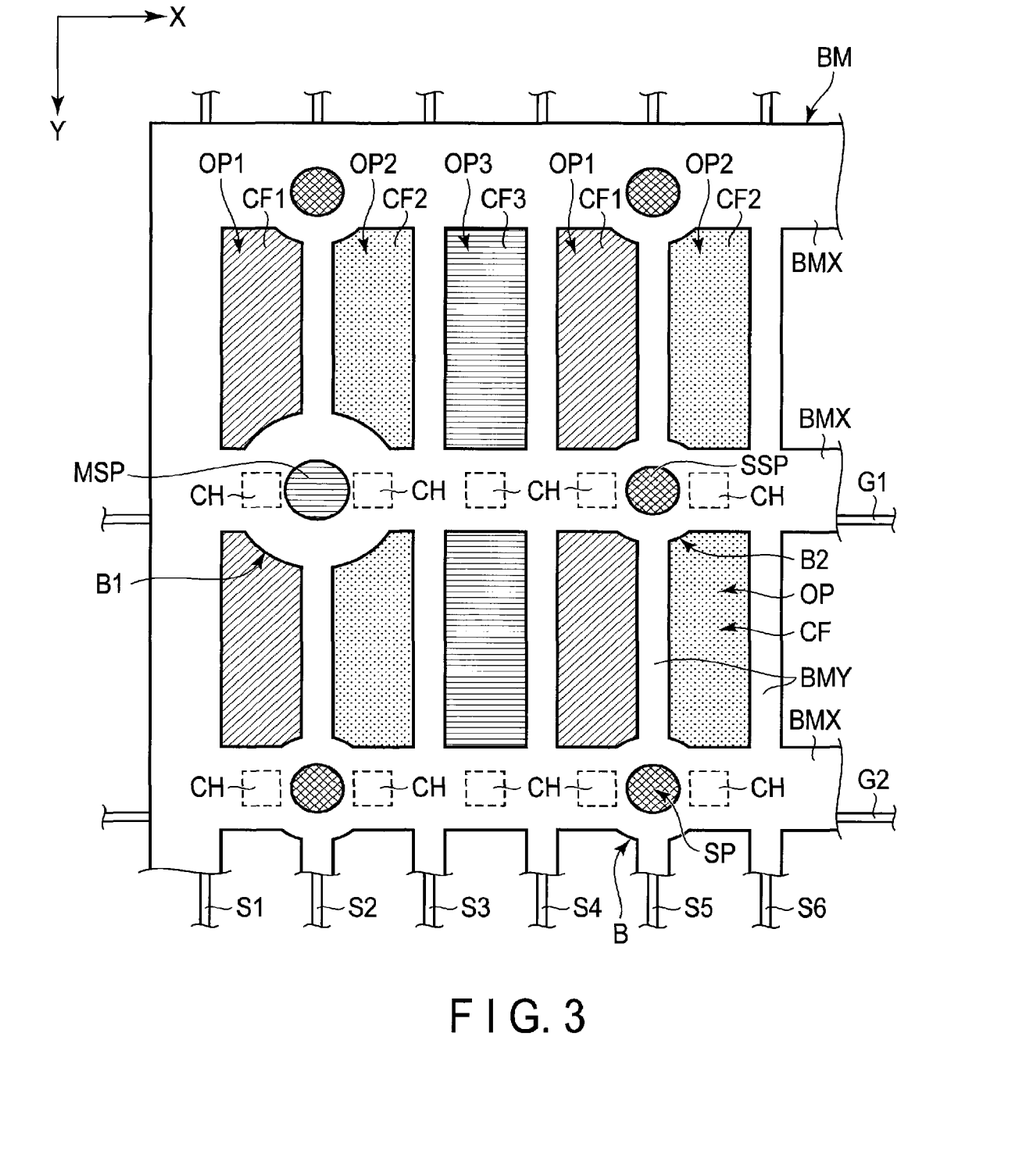
FIG. 3 is a plan view showing an arrangement example of a light-shielding layer BM and a color filter layer CF.

FIG. 3 is a plan view showing an arrangement example of a light-shielding layer BM and a color filter layer CF. The figure shows a plan view in the X-Y plane. The light-shielding layer BM and the color filter layer CF are provided on the second substrate SUB2 shown in FIG. 2.

In the example illustrated, the light-shielding layer BM is formed in a lattice shape, and comprises a first portion BMX and a second portion BMY. The first portions BMX are arranged at intervals in the second direction Y, and extend in the first direction X. Parts of the first portions BMX overlap the scanning lines G in planar view. The first portions BMX are each formed in a strip shape having a substantially constant width in the second direction Y. The second portions BMY are arranged at intervals in the first direction X, and extend in the second direction Y. Parts of the second portions BMY overlap the signal lines S in planar view. The second portions BMY are each formed in a strip shape having a substantially constant width in the first direction X.

Opening portions OP are delimited by the light-shielding layer BM, and arranged in a matrix in the first direction X and second direction Y. For example, the opening portions OP comprise opening portions OP1, opening portions OP2, and opening portions OP3. The opening portions OP1 to OP3 are color pixels which display mutually different colors. The opening portion OP1 corresponding to a first color pixel, the opening portion OP2 corresponding to a second color pixel, and the opening portion OP3 corresponding to a third color pixel are arranged in this order in the first direction X, and a set of these opening portions OP1 to OP3 is repeatedly arranged in the first direction X. In addition, the opening portions OP1 to OP3 are arranged in the second direction Y. In one example, the opening portions OP1 correspond to red pixels, the opening portions OP2 correspond to green pixels, and the opening portions OP3 correspond to blue pixels.

The color filter layer CF includes a color filter CF1 of a first color, a color filter CF2 of a second color, and a color filter CF3 of a third color. The color filter CF1 is disposed at the opening portion OP1, the color filter CF2 is disposed at the opening portion OP2, and the color filter CF3 is disposed at the opening portion OP3. The first, second, and third colors are colors different from each other. In one example, the color filters CF1 are red color filters, the color filters CF2 are green color filters, and the color filters CF3 are blue color filters. In the figure, the color filters CF1 are represented by upward-sloping hatch lines, the color filters CF2 are represented by dots, and the color filters CF3 are represented by horizontal lines. Selection of the colors of the color filters CF1 to CF3 is not limited to the example illustrated.

The light-shielding layer BM comprises a light-shielding portion B. The light-shielding portion B is located at an intersection where the first portion BMX and the second portion BMY cross each other, and is broadened more widely than a width of the first portion BMX and a width of the second portion BMY. The light-shielding portion B of the present embodiment is not limited to an intersection where the first portion BMX and the second portion BMY intersect in a cross shape, but may be intersections where the first portion BMX and the second portion BMY intersect in the shape of letter T or letter Y. In one example, the light-shielding layer BM comprises light-shielding portions B1 and B2 overlapping the scanning line G1. The light-shielding portion B1 corresponds to a first light-shielding portion. The light-shielding portion B2 corresponds to a second light-shielding portion, and has an area smaller than the light-shielding portion B1. Each of the light-shielding portions B1 and B2 is adjacent to the opening portion OP1 and the opening portion OP2. In other words, the light-shielding portions B1 and B2 are each adjacent to the red pixel and the green pixel. Alternatively, the light-shielding portions B1 and B2 may be adjacent to the opening portion (red pixel) OP1 and the opening portion (blue pixel) OP3 or adjacent to the opening portion (green pixel) OP2 and the opening portion (blue pixel) OP3.

The main spacer MSP and the light-shielding portion B1 overlap one another in planar view. The sub-spacer SSP and the light-shielding portion B2 overlap one another in planar view. All of the spacers SP overlap one of the light-shielding portions B. In the drawing, the sub-spacer SSP is represented by sloped cross lines, and the main spacer MSP is represented by horizontal lines.

Note that contact holes CH arranged along the scanning lines G1 and G2 overlap the first portions BMX, as shown by dotted squares in the drawing.

Figure 4:
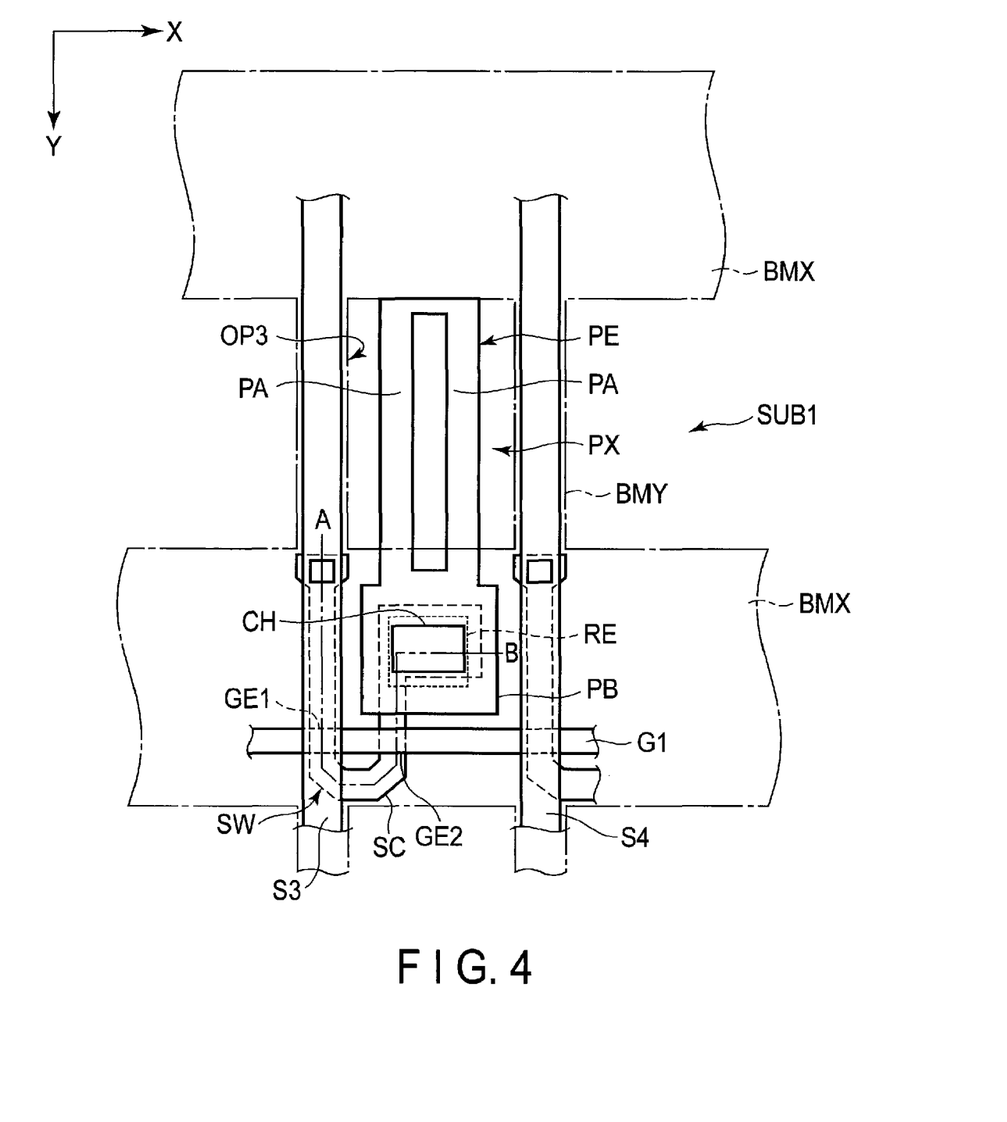
FIG. 4 is a plan view showing a configuration example of a pixel PX when a first substrate SUB1 shown in FIG. 2 is viewed from a second substrate SUB2.

FIG. 4 is a plan view showing a configuration example of the pixel PX when the first substrate SUB1 shown in FIG. 2 is viewed from the second substrate SUB2. The pixel PX of the illustrated example includes the opening portion OP3 between signal lines S3 and S4 shown in FIG. 3. The illustrated configuration example of the pixel PX corresponds to an example employing a fringe field switching (FFS) mode, which is one of the display modes using the lateral electric field. The first substrate SUB1 comprises the scanning line G1, the signal lines S3 and S4, the switching element SW, and the pixel electrode PE. In one example, the first substrate SUB1 comprises the common electrode, but this is not illustrated in the drawing.

The scanning line G1 extends in, for example, the first direction X. The signal lines S3 and S4 are disposed at an interval in the first direction X, and extend in the second direction Y. The switching element SW is electrically connected to the scanning line G1 and the signal line S3. The switching element SW of the illustrated example has a double-gate structure. The switching element SW comprises a semiconductor layer SC and a relay electrode RE. The relay electrode RE constitutes a terminal of the switching element SW. In the semiconductor layer SC, a part of it overlaps the signal line S3 and the other part extends between the signal lines S3 and S4 in such a way that the semiconductor layer SC is formed to be substantially U-shaped. The relay electrode RE is formed in an island shape, and is located between the signal lines S3 and S4.

The pixel electrode PE is located between the signal lines S3 and S4. The pixel electrode PE comprises a main electrode portion PA and a contact portion PB. The main electrode portion PA and the contact portion PB are formed integrally or continuously, and are electrically connected to each other. The pixel electrode PE illustrated in the figure comprises two main electrode portions PA extending from the contact portion PB. The main electrode portions PA extend linearly in the second direction Y. The two main electrode portions PA are arranged at an interval in the first direction X, and formed in a strip shape having substantially the same width along the first direction X. The contact portion PB overlaps the relay electrode RE, and is in contact with the relay electrode RE at the contact hole CH. The pixel electrode PE is thereby electrically connected to the switching element SW. The shape of the pixel electrode PE is not limited to the example illustrated but can be arbitrarily changed in accordance with, for example, the shape of the pixel PX. For example, the pixel electrode PE may extend obliquely in a direction intersecting the first direction X and the second direction Y, and the main electrode portions PA may extend in the oblique direction.

Figure 5:
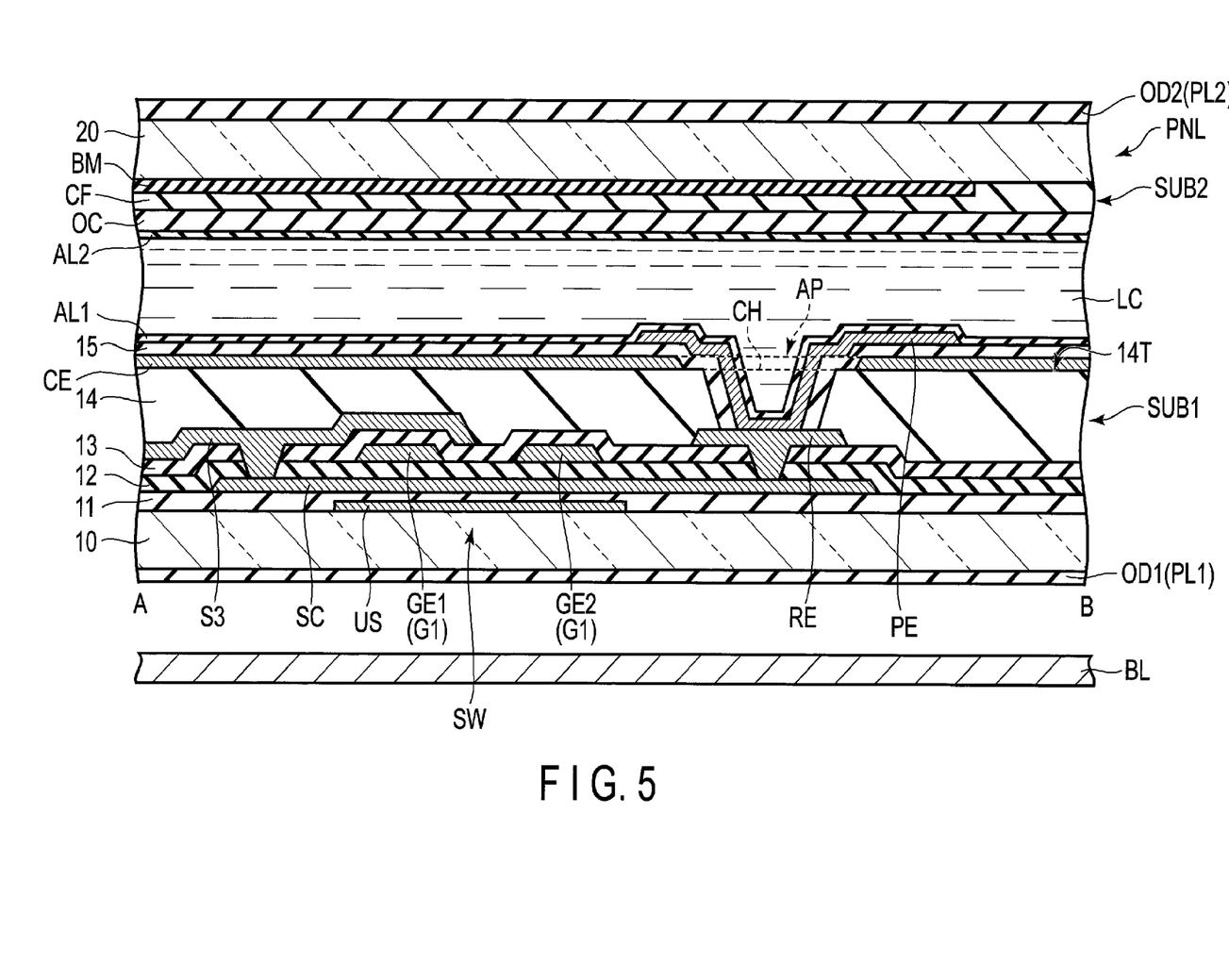
FIG. 5 is a cross-sectional view showing the structure of a part of the display panel PNL taken along line A-B of FIG. 4.

FIG. 5 is a cross-sectional view showing the structure of a part of the display panel PNL taken along line A-B of FIG. 4. The first substrate SUB1 includes an insulating substrate 10, insulating layers 11 to 15, a lower light-shielding layer US, the semiconductor layer SC, the scanning line G1, the signal line S3, the relay electrode RE, the common electrode CE, the pixel electrode PE, and an alignment film AL1. The insulating substrate 10 is a light transmissive substrate such as a glass substrate or a resin substrate. The lower light-shielding layer US is located on the insulating substrate 10, and is covered with the insulating layer 11. The lower light-shielding layer US blocks the light traveling from a backlight unit BL to the semiconductor layer SC. The semiconductor layer SC is located on the insulating layer 11, and is covered with the insulating layer 12. The semiconductor layer SC is formed of, for example, polycrystalline silicon, but may be formed of amorphous silicon or an oxide semiconductor. Gate electrodes GE1 and GE2, which are parts of the scanning line G1, are located on the insulating layer 12, and are covered with the insulating layer 13. The scanning line G1 is formed of a metal material such as aluminum (Al), titanium (Ti), silver (Ag), molybdenum (Mo), tungsten (W), copper (Cu) or chromium (Cr), or an alloy obtained by combining the aforementioned metal materials. The scanning line G1 may have a single-layer structure or a multilayer structure. Preferably, the lower light-shielding layer US should be located directly under the semiconductor layer SC at a position opposed to the gate electrodes GE1 and GE2. The signal line S3 and the relay electrode RE are located on the insulating layer 13, and are covered with the insulating layer 14. The signal line S3 and the relay electrode RE are formed of the same material, and the above-mentioned metal materials are applicable for the formation. The signal line S3 is in contact with the semiconductor layer SC through a contact hole penetrating the insulating layers 12 and 13. The relay electrode RE is in contact with the semiconductor layer SC through a contact hole penetrating the insulating layers 12 and 13.

The common electrode CE is located on an upper surface 14T of the insulating layer 14, and is covered with the insulating layer 15. The pixel electrode PE is located on the insulating layer 15, and is covered with the alignment film AL1. A part of the pixel electrode PE is opposed to the common electrode CE via the insulating layer 15. The common electrode CE and the pixel electrode PE are formed of a transparent conductive material such as indium-tin-oxide (ITO) or indium-zinc-oxide (IZO). The pixel electrode PE is in contact with the relay electrode RE through the contact hole CH penetrating the insulating layers 14 and 15 at a position overlapping an aperture AP of the common electrode CE. Note that each of the insulating layers 11 to 13 and the insulating layer 15 is an inorganic insulating layer made of, for example, silicon oxide, silicon nitride, or silicon oxynitride, and may have a single-layer structure or a multilayer structure. The insulating layer 14 is an organic insulating layer made of acrylic resin, etc.

The second substrate SUB2 comprises an insulating substrate 20, the light-shielding layer BM, the color filter layer CF, an overcoat layer OC, an alignment film AL2. The insulating substrate 20 is a light transmissive substrate such as a glass substrate or a resin substrate. The light-shielding layer BM and the color filter layer CF are located on a side of the insulating substrate 20, which is opposed to the first substrate SUB1. The light-shielding layer BM is formed in a lattice shape as explained above, and delimits the pixels. In each pixel, an inner area delimited by the light-shielding layer BM corresponds to the above-explained opening portion, and can be an area which contributes to display. In one example, the light-shielding layer BM is disposed at a position opposed to each of the line portions such as the signal lines S, the scanning lines G, the switching element SW, and the like. The color filter layer CF is arranged at a position opposed to the pixel electrode PE, and a part of the color filter layer CF overlaps the light-shielding layer BM. The color filter layer CF includes the color filters CF1 to CF3 described above. The overcoat layer OC covers the color filter layer CF. The overcoat layer OC is a transparent organic insulating layer. The alignment film AL2 covers the overcoat layer OC. Note that the color filter layer CF may be arranged in the first substrate SUB1. The light-shielding layer BM may be arranged between the color filter layer CF and the overcoat layer OC, or between the overcoat layer OC and the alignment film AL2. Also, a pixel which displays white may be added, or a white color filter or an uncolored resin material may be disposed on the white pixel. Alternatively, the overcoat layer OC may be merely disposed without arranging the white color filter.

The first substrate SUB1 and the second substrate SUB2 described above are arranged such that the alignment film AL1 and the alignment film AL2 are opposed to each other. A predetermined cell gap is formed between the alignment film AL1 and the alignment film AL2. The cell gap is, for example, 2 to 5 µm. The first substrate SUB1 and the second substrate SUB2 are bonded to each other by a sealant in a state in which the predetermined cell gap is formed.

The liquid crystal layer LC is located between the first substrate SUB1 and the second substrate SUB2, and is held between the alignment film AL1 and the alignment film AL2. The liquid crystal layer LC includes liquid crystal molecules. The liquid crystal layer LC is formed of a liquid crystal material of a positive type (positive dielectric anisotropy) or a negative type (negative dielectric anisotropy).

The optical element OD1 comprising a polarizer PL1 is disposed under the first substrate SUB1 with respect to the display panel PNL having the above structure. In addition, the optical element OD2 comprising a polarizer PL2 is disposed above the second substrate SUB2. In one example, the polarizer PL1 and the polarizer PL2 are disposed such that their absorption axes are orthogonal to each other in the X-Y plane. Further, each of the optical element OD1 and the optical element OD2 may comprise a retardation plate such as a quarter-wave plate or a half-wave plate, a scattering layer, an antireflective layer and the like as needed.

In this configuration example, in an off-state in which an electric field is not formed between the pixel electrode PE and the common electrode CE, the liquid crystal molecules included in the liquid crystal layer LC are subjected to initial alignment in a predetermined direction between the alignment film AL1 and the alignment film AL2. In such an off-state, the light emitted from the backlight unit BL to the display panel PNL is absorbed by the optical element OD1 and the optical element OD2, so that dark display is exhibited. In contrast, in an on-state in which an electric field is produced between the pixel electrode PE and the common electrode CE, the liquid crystal molecules are aligned in a direction different from the initial alignment direction by the electric field, and the alignment direction is controlled by the electric field. In such an on-state, part of the light from the backlight unit BL is transmitted through the optical element OD1 and the optical element OD2, so that bright display is exhibited.

Figure 6:
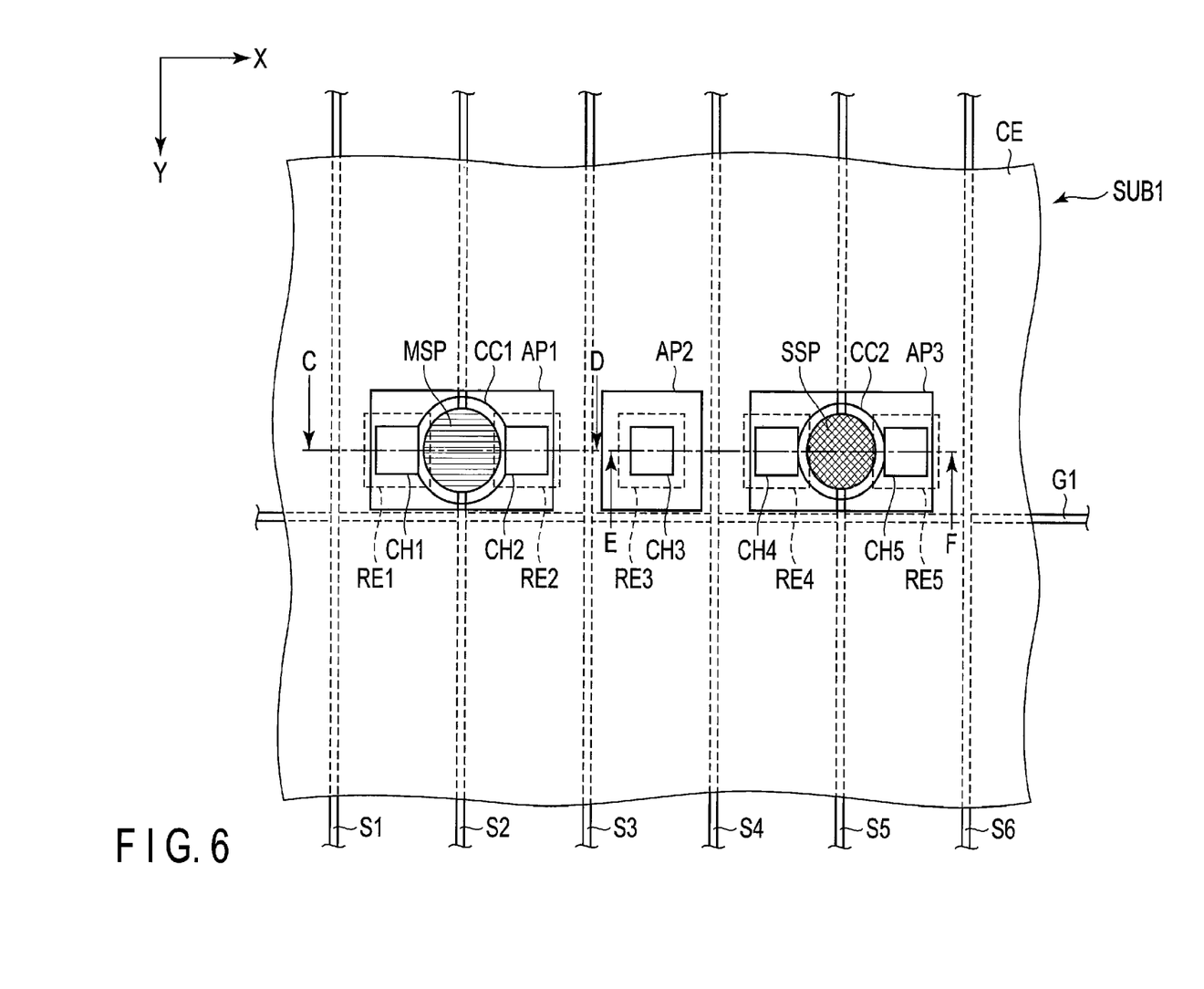
FIG. 6 is an enlarged plan view of main portions of the first substrate SUB1.

FIG. 6 is an enlarged plan view of the main portions of the first substrate SUB1. A relay electrode RE1 is located between the signal lines S1 and S2, and a relay electrode RE2 is located between the signal lines S2 and S3. Similarly, the other relay electrodes RE3 to RE5 are located between adjacent signal lines. The relay electrodes RE1 to RE5 are arranged at substantially regular intervals along the first direction X. As shown in FIG. 5, the relay electrodes RE1 to RE5 are located between the insulating layers 13 and 14.

A contact hole CH1 penetrates to the relay electrode RE1, and a contact hole CH2 penetrates to the relay electrode RE2. Similarly, the other contact holes CH3 to CH5 penetrate to the relay electrodes RE3 to RE5, respectively. These contact holes CH1 to CH5 are provided in the insulating layer 14.

A concavity CC1 is located between the contact holes CH1 and CH2, and overlaps a part of the signal line S2. A concavity CC2 is located between the contact holes CH4 and CH5, and overlaps a part of a signal line S5. These concavities CC1 and CC2 are provided on the upper surface 14T of the insulating layer 14. In one example, the concavities CC1 and CC2 are formed to be substantially circular in planar view. In the example illustrated, no concavity is provided between the contact holes CH2 and CH3, and between the contact holes CH3 and CH4. In planar view, the concavity CC2 is smaller than the concavity CC1.

The main spacer MSP is located in the concavity CC1. The sub-spacer SSP is located in the concavity CC2. In one example, the main spacer MSP and the sub-spacer SSP are formed to have a substantially circular cross-section in planar view. The concavity CC1 is larger than the main spacer MSP, and the concavity CC2 is larger than the sub-spacer SSP.

The common electrode CE includes a single aperture AP1 surrounding the contact holes CH1 and CH2, and the concavity CC1. In planar view, the main spacer MSP is located inside the aperture AP1, and does not overlap the common electrode CE. Further, at the concavity CC1, the common electrode CE does not overlap the signal line S3.

Furthermore, the common electrode CE includes apertures AP2 and AP3. The aperture AP2 surrounds the contact hole CH3. The aperture AP3 surrounds the contact holes CH4 and CH5, and the concavity CC2. In planar view, the sub-spacer SSP is located inside the aperture AP3, and does not overlap the common electrode CE. Further, at the concavity CC2, the common electrode CE does not overlap the signal line S5. Note that the apertures AP1 to AP3 may be replaced by a single aperture.

In the example illustrated, the common electrode CE extends along the signal line S3 between the apertures AP1 and AP2, and extends along the signal line S4 between the apertures AP2 and AP3. The common electrode CE overlaps the scanning line G1, and overlaps the signal lines S1 to S5 except for an area of the apertures AP1 and AP3. For this reason, undesired leakage field from the scanning line C1 and the signal lines S1 to S5 can be blocked. By the presence of the apertures AP1 to AP3 formed locally, division of the common electrode CE can be avoided.

In one example, the relay electrode RE1 corresponds to a first relay electrode, the relay electrode RE2 corresponds to a second relay electrode, the contact hole CH1 corresponds to a first contact hole, the contact hole CH2 corresponds to a second contact hole, the concavity CC1 corresponds to a first concavity, the concavity CC2 corresponds to a second concavity, the insulating layer 14 corresponds to a first insulating layer, the insulating layer 15 corresponds to a second insulating layer, the signal line S1 corresponds to a first signal line, and the signal line S2 corresponds to a second signal line.

Figure 7:
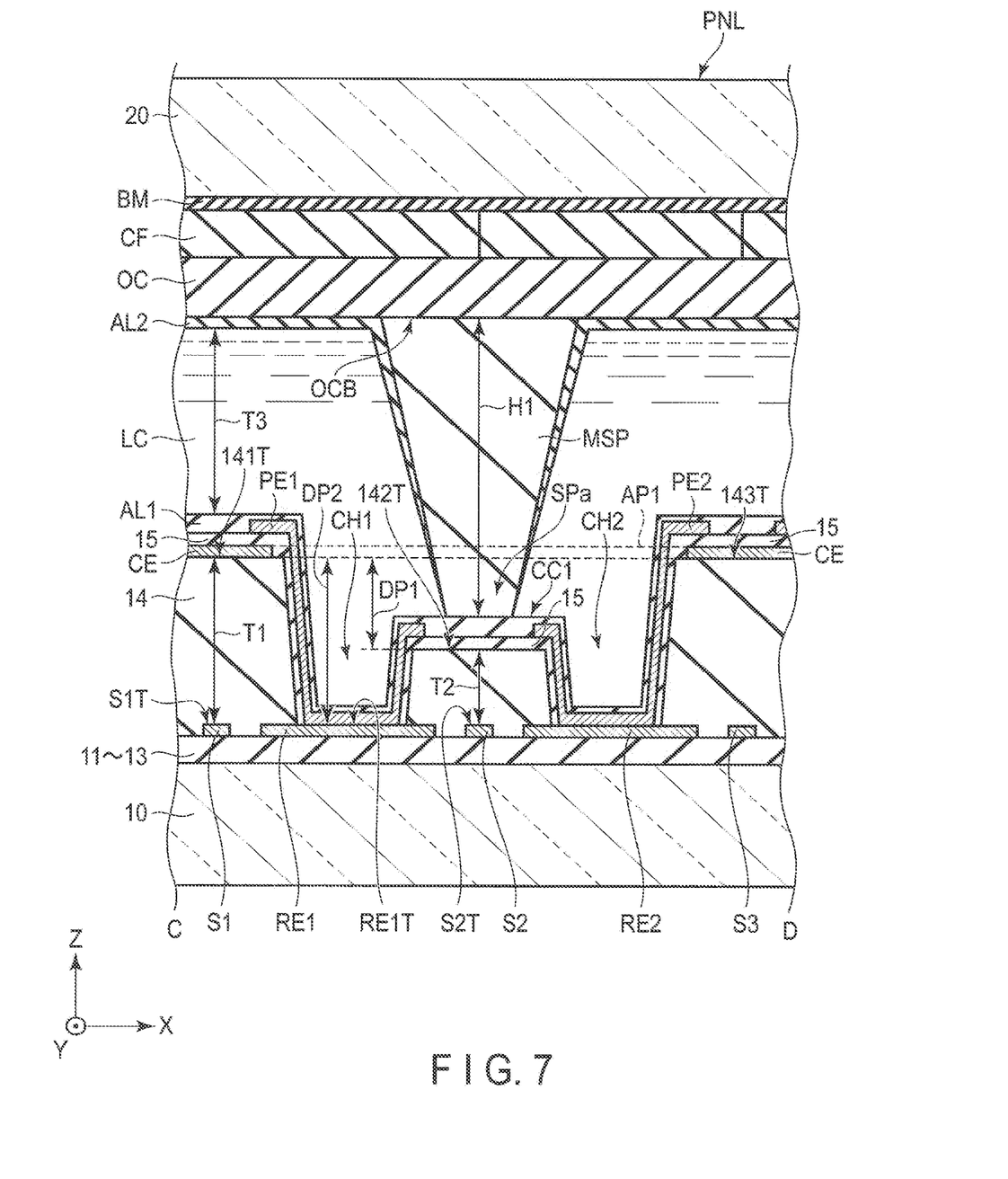
FIG. 7 is a cross-sectional view showing the structure of the display panel PNL taken along line C-D including an aperture AP1 shown in FIG. 6.

FIG. 7 is a cross-sectional view showing the structure of the display panel PNL taken along line C-D including the aperture AP1 shown in FIG. 6. The contact hole CH1, the concavity CC1, and the contact hole CH2 are arranged in this order in the first direction X. In the example illustrated, the contact holes CH1 and CH2 and the concavity CC1 are connected to each other in the first direction X. The contact holes CH1 and CH2 and the concavity CC1 are formed in the insulating layer 14. The insulating layer 14 includes an upper surface 141T directly above the signal line S1, an upper surface 142T directly above the signal line S2, and an upper surface 143T directly above the signal line S3. The upper surfaces 141T and 143T are located at substantially the same height from the insulating substrate 10, and are positioned in the same plane parallel to the X-Y plane. The upper surface 142T is positioned lower than the upper surface 141T. The upper surface 142T corresponds to a bottom of the concavity CC1. Note that the upper surfaces 141T, 142T, and 143T are not necessarily flat surfaces as shown in the drawing. More specifically, since the insulating layer 14 is formed of an organic material, the upper surface may be curved due to melting or contraction, etc., which occurs in a process until the organic material is cured after the organic material has been applied.

The contact hole CH1 penetrates to the relay electrode RE1. A pixel electrode PE1 is in contact with the relay electrode RE1 in the contact hole CH1. The contact hole CH2 penetrates to the relay electrode RE2. A pixel electrode PE2 is in contact with the relay electrode RE2 in the contact hole CH2.

The concavity CC1 has a first depth DP1. The contact hole CH1 has a second depth DP2. The first depth DP1 corresponds to a length between the upper surface 141T and the upper surface 142T along the third direction Z. The second depth DP2 corresponds to a length between the upper surface 141T and an upper surface RE1T of the relay electrode RE1 along the third direction Z. The first depth DP1 is greater than zero, and less than or equal to the second depth DP2. In one example, the first depth DP1 is 0.5 μm or more, and more preferably, 1 μm or more.

The insulating layer 14 has a first thickness T1 directly above the signal line S1, and has a second thickness T2 directly above the signal line S2. The first thickness T1 corresponds to a length between the upper surface 141T and an upper surface S1T of the signal line S1 along the third direction Z. In one example, the first thickness T1 is 1 to 3 μm. The second depth DP2 is substantially equal to the first depth T1. The second thickness T2 corresponds to a length between the upper surface 142T and an upper surface S2T of the signal line S2 along the third direction Z. The second thickness T2 is greater than or equal to zero, and less than the first thickness T1. The first depth DP1 corresponds to a difference between the first thickness T1 and the second thickness T2.

The common electrode CE is located on the upper surfaces 141T and 143T, but is not located on the upper surface 142T. The upper surface 142T is covered with the insulating layer 15. In other words, in the concavity CC1, the insulating layer 15 is in contact with the insulating layer 14, and covers the entire surface of the upper surface 142T. Also, the alignment film AL1 is in contact with the insulating layer 15. Not only the common electrode CE, but the pixel electrodes PE1 and PE2 are also not disposed directly above the signal line S2.

The main spacer MSP is provided on a lower surface OCB of the overcoat layer OC. The main spacer MSP is located directly above the signal line S2 in the concavity CC1. In the example illustrated, the insulating layer 14, the insulating layer 15, and the alignment film AL1 overlap one another in this order in the third direction Z between the main spacer MSP and the signal line S2. The main spacer MSP includes an end portion SPa which is in contact with the alignment film AL1. A position of the end portion SPa in the third direction Z is below the upper surface 141T, and above the upper surface 142T. The main spacer MSP has a first height H1. The first height H1 corresponds to a length between the alignment film AL1 at the concavity CC1 and the overcoat layer OC along the third direction Z. The first height H1 is, for example, greater than a thickness T3 of the liquid crystal layer LC directly above the signal line S1. The thickness T3 corresponds to a length between the alignment film AL1 and the alignment film AL2 along the third direction Z.

Figure 8:
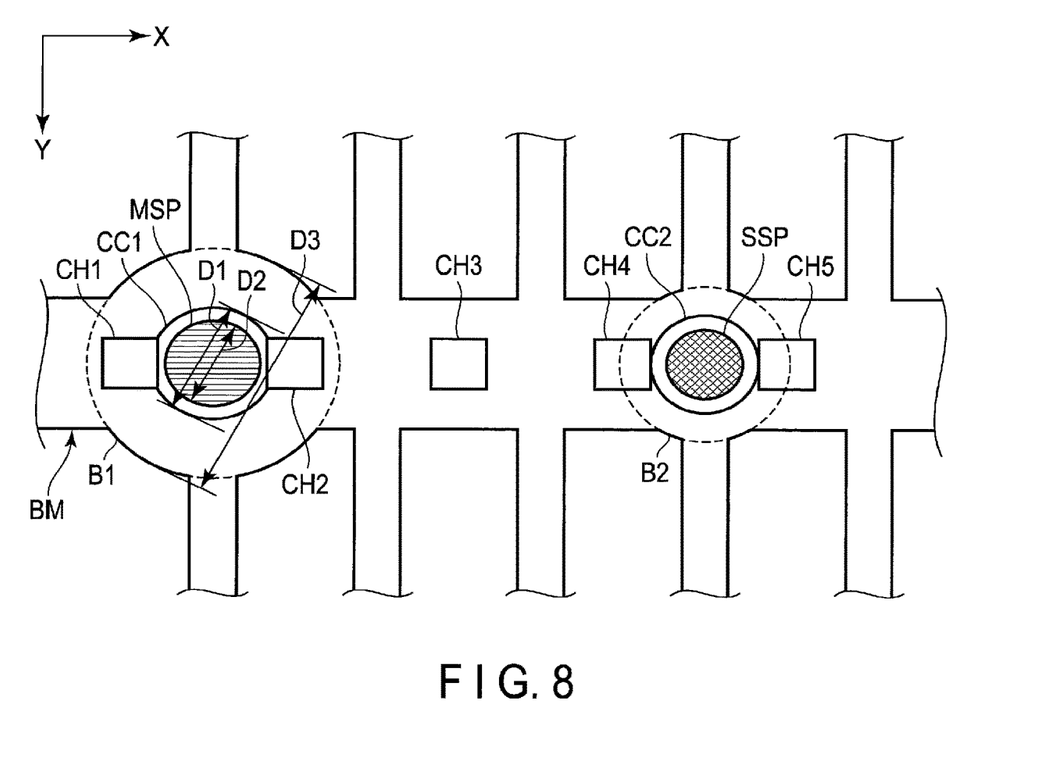
FIG. 8 is a plan view showing an arrangement example of a light-shielding layer BM, a main spacer MSP, and a sub-spacer SSP.

FIG. 8 is a plan view showing an arrangement example of the light-shielding layer BM, the main spacer MSP, and the sub-spacer SSP. The light-shielding portion B1 overlaps the main spacer MSP and the concavity CC1. In planar view, the concavity CC1 is greater than the main spacer MSP, and smaller than the light-shielding portion B1. In the example illustrated, the concavity CC1, the main spacer MSP, and the light-shielding portion B1 are formed to be substantially circular, and have diameters D1 to D3, respectively. The diameter D1 of the concavity CC1 is greater than the diameter D2 of the main spacer MSP, and smaller than the diameter D3 of the light-shielding portion B1. Note that the diameter D1 corresponds to a diameter in the X-Y plane at the upper surface 142T shown in FIG. 7, and the diameter D2 corresponds to a diameter of the end portion SPa of the main spacer MSP. In one example, the diameter D1 should preferably be 1.5 times larger than the diameter D2.

Similarly, the light-shielding portion B2 overlaps the sub-spacer SSP and the concavity CC2. The concavity CC2 is greater than the sub-spacer SSP, and smaller than the light-shielding portion B2.

Figure 9:
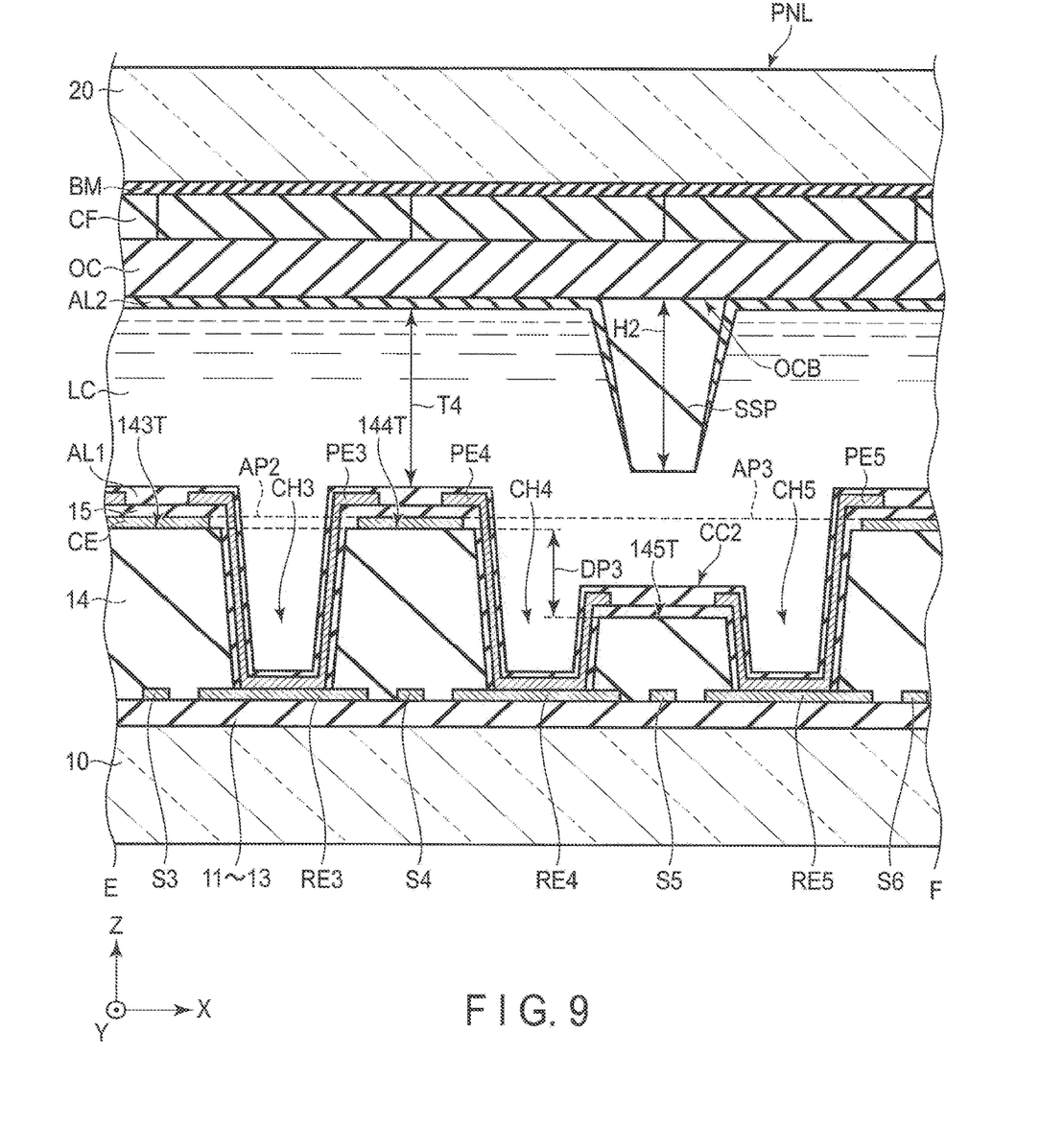
FIG. 9 is a cross-sectional view showing the structure of the display panel PNL taken along line E-F including apertures AP2 and AP3 shown in FIG. 6.

FIG. 9 is a cross-sectional view showing the structure of the display panel PNL taken along line E-F including the apertures AP2 and AP3 shown in FIG. 6. The contact hole CH3, the contact hole CH4, the concavity CC2, and the contact hole CH5 are arranged in this order in the first direction X. In the example illustrated, the contact holes CH4 and CH5 and the concavity CC2 are connected to each other in the first direction X. The contact holes CH3 to CH5 and the concavity CC2 are formed in the insulating layer 14. The insulating layer 14 includes an upper surface 144T directly above the signal line S4, and an upper surface 145T directly above the signal line S5. The upper surface 145T corresponds to a bottom of the concavity CC2.

The concavity CC2 has a third depth DP3. The third depth DP3 corresponds to a length between the upper surface 144T and the upper surface 145T along the third direction Z. The third depth DP3 is greater than zero, and less than or equal to the first depth DP1. The upper surface 145T is positioned lower than the upper surfaces 143T and 144T.

The common electrode CE is not located on the upper surface 145T. The upper surface 145T is covered with the insulating layer 15. In other words, in the concavity CC2, the insulating layer 15 is in contact with the insulating layer 14, and covers the entire surface of the upper surface 145T. Also, the alignment film AL1 is in contact with the insulating layer 15. Not only the common electrode CE, but the pixel electrodes PE1 and PE2 are also not disposed directly above the signal line S5.

The sub-spacer SSP is provided on the lower surface OCB of the overcoat layer OC. The sub-spacer SSP is opposed to the concavity CC2, and is located directly above the signal line S5. In the example illustrated, the insulating layer 14, the insulting layer 15, the alignment film AL1, and the liquid crystal layer LC overlap one another in this order in the third direction Z between the sub-spacer SSP and the signal line S5, and the sub-spacer SSP does not contact the alignment film AL1. The sub-spacer SSP has a second height H2. The second height H2 is less than the first height H1 of the main spacer MSP. The second height H2 is, for example, less than a thickness T4 of the liquid crystal layer LC directly above the signal line S4.

According to the present embodiment described above, with respect to the main spacer MSP, the end portion SPa is arranged within the concavity CC1 and maintains the cell gap. Accordingly, even if force is applied to the display panel PNL externally, the main spacer MSP stays within the concavity CC1. For this reason, the cell gap can be maintained stably. Consequently, deterioration in display quality due to fluctuations in the cell gap can be suppressed.

It has been confirmed by the inventor that if the first depth DP1 of the concavity CC1 is greater than or equal to 0.5 µm, the main spacer MSP does not easily protrude outside the concavity CC1 when a force within expectations is applied to the display panel PNL externally. Further, if the first depth DP1 is greater than or equal to 1.0 µm, it has been confirmed that the main spacer MSP surely stays within the concavity CC1 when a force within expectations is applied to the display panel PNL externally.

Further, the concavity CC1 and the main spacer MSP are formed at positions overlapping the light-shielding portion 31, and do not contribute to display of the display panel PNL. Accordingly, even if the end portion SPa of the main spacer MSP is displaced inside the concavity CC1 as a result of force being applied to the display panel PNL externally, the displaced end portion SPa merely damages the alignment film AL1 in the concavity CC1. In other words, in the periphery of the concavity CC1, it is possible to prevent the alignment film AL1 from being damaged by the main spacer MSP in an area which contributes to display. Accordingly, deterioration in the display quality caused by damage to the alignment film AL1 can be suppressed.

Further, when force is applied to the display panel PNL externally, a movable range of the main spacer MSP can be restricted to a region within the concavity CC1. In other words, the movable range of the main spacer MSP can be restricted without increasing the area of the light-shielding portion B1 which overlaps the main spacer MSP. Accordingly, an area which contributes to display per pixel is not reduced, and a decrease in transmissivity can be suppressed. Alternatively, by restricting the movable range of the main spacer MSP, the area of the light-shielding portion B1 can be reduced. Accordingly, an area which contributes to display per pixel can be increased, and the transmissivity can be improved.

In the insulating layer 14, the second thickness T2 directly above the signal line S2 is less than the first thickness T1 directly above the signal line S1. Since the common electrode CE is not disposed directly above the signal line S2, it is possible to prevent undesired capacitance from being produced by the common electrode CE approaching the signal line S2.

Note that each of the main spacer MSP shown in FIG. 7 and the sub-spacer SSP shown in FIG. 9 can be formed of a resin material. For example, the main spacer MSP and the sub-spacer SSP can be formed of the same resin material as that used for the overcoat layer OC, and can be formed together with the overcoat layer OC.

Next, another configuration example will be described. Note that the same reference numbers will be added to the same structures as those of the configuration example described above, and detailed descriptions of them will be omitted.

Figure 10:
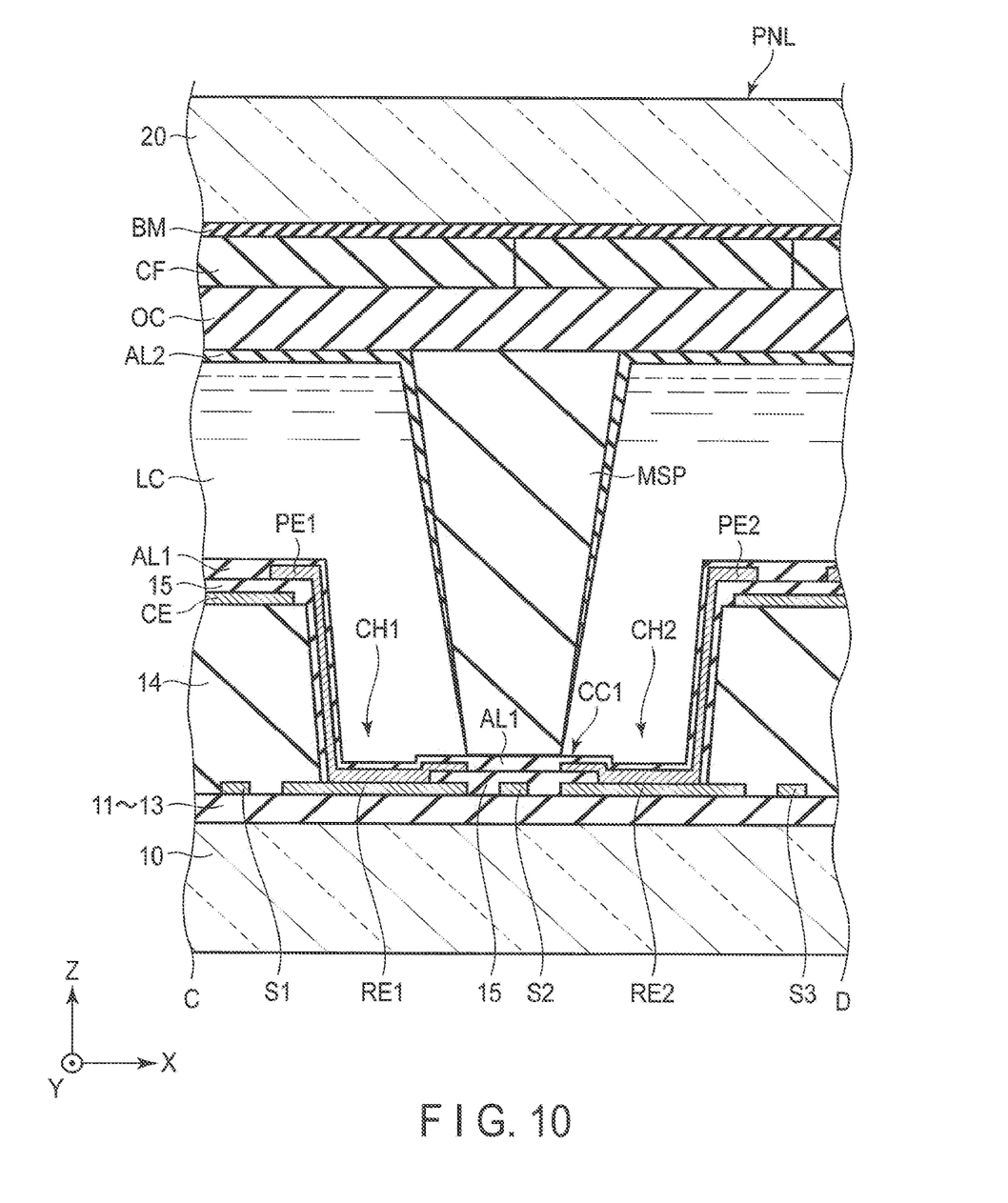
FIG. 10 is a cross-sectional view showing another structure of the display panel PNL taken along line C-D including the aperture AP1 shown in FIG. 6.

FIG. 10 is a cross-sectional view showing another structure of the display panel PNL taken along line C-D including the aperture AP1 shown in FIG. 6. The structure shown in FIG. 10 is different from the structure shown in FIG. 7 in that the insulating layer 14 is not disposed directly above the signal line S2. The signal line S2, and the relay electrodes RE1 and RE2 are covered with the insulating layer 15. In the contact hole CH1, the pixel electrode PE1 is in contact with the relay electrode RE1. In the contact hole CH2, the pixel electrode PE2 is in contact with the relay electrode RE2. The main spacer MSP is in contact with the alignment film AL1 in the concavity CC1. The insulating layer 15 and the alignment film AL1 overlap one another in this order in the third direction Z between the signal line S2 and the main spacer MSP, and the insulating layer 14, the common electrode CE, and the pixel electrodes PE1 and PE2 are not interposed between the signal line S2 and the main spacer MSP.

Also in this configuration example, the same advantage as that of the above-described configuration example can be obtained.

As explained above, according to the present embodiment, a display device capable of suppressing deterioration in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate comprising a first relay electrode, a second relay electrode, and a first insulating layer including a first contact hole penetrated to the first relay electrode and a second contact hole penetrated to the second relay electrode;
   a second substrate opposed to the first substrate; and
   a main spacer located between the first substrate and the second substrate,
   the first insulating layer further including a first concavity located between the first contact hole and the second contact hole,
   the main spacer being located in the first concavity, and maintaining a cell gap between the first substrate and the second substrate.

2. The display device of claim 1, wherein a depth of the first concavity is less than or equal to a depth of the first contact hole.

3. The display device of claim 2, wherein the depth of the first concavity is 0.5 µm or more.

4. The display device of claim 1, wherein:
   the first substrate further comprises a common electrode located on the first insulating layer; and the common electrode includes a single aperture surrounding the first contact hole, the first concavity, and the second contact hole.

5. The display device of claim 4, wherein:
the first substrate further comprises a first signal line and a second signal line;
the first relay electrode is located between the first signal line and the second signal line; and
the first concavity is located directly above the second signal line.

6. The display device of claim 5, wherein:
the first insulating layer has a first thickness directly above the first signal line, and a second thickness directly above the second signal line; and
the second thickness is less than the first thickness.

7. The display device of claim 6, wherein:
the common electrode extends along the first signal line.

8. The display device of claim 5, wherein:
the first insulating layer is an organic insulating layer, and includes a first upper surface directly above the first signal line, and a second upper surface directly above the second signal line; and
the main spacer includes an end portion, and a position of the end portion is below the first upper surface, and above the second upper surface.

9. The display device of claim 8, wherein the first substrate further comprises a second insulating layer which is in contact with the second upper surface, and an alignment film which is in contact with the second insulating layer and the end portion.

10. The display device of claim 9, wherein:
the first substrate further comprises a pixel electrode located on the second insulating layer, and being electrically connected to the first relay electrode at the first contact hole;
the second insulating layer is an inorganic insulating layer located between the pixel electrode and the common electrode; and
the alignment film covers the second insulating layer and the pixel electrode.

11. The display device of claim 1, wherein:
the second substrate comprises a light-shielding portion overlapping the main spacer; and
the first concavity is greater than the main spacer, and smaller than the light-shielding portion in planar view.

12. The display device of claim 1, further comprising a sub-spacer located between the first substrate and the second substrate, and being separated from the first substrate, wherein
the first insulating layer further includes a second concavity opposed to the sub-spacer, and
a depth of the second concavity is less than or equal to a depth of the first concavity.

13. The display device of claim 12, wherein the second concavity is greater than the sub-spacer, and smaller than the first concavity in planar view.

14. A display device comprising:
a first substrate comprising an organic insulating layer including a first concavity and a second concavity;
a second substrate opposed to the first substrate;
a main spacer, which is provided on the second substrate, is located in the first concavity, and maintains a cell gap between the first substrate and the second substrate; and
a sub-spacer, which is provided on the second substrate, is opposed to the second concavity, and is separated from the first substrate, wherein:
the organic insulating layer includes first to fourth contact holes arranged along a first direction;
the first concavity is located between the first contact hole and the second contact hole;
the second concavity is located between the third contact hole and the fourth contact hole.

15. The display device of claim 14, wherein:
the first substrate further comprises a first signal line, a second signal line located directly below the main spacer, and a third signal line located directly below the sub-spacer;
each of the first to third signal lines extends in a second direction intersecting the first direction;
the organic insulating layer includes a first upper surface directly above the first signal line, a second upper surface directly above the second signal line, and a third upper surface directly above the third signal line; and
the second upper surface and the third upper surface are positioned lower than the first upper surface.

16. The display device of claim 15, wherein:
the main spacer includes an end portion; and
a position of the end portion is below the first upper portion, and above the second upper surface.

17. The display device of claim 16, wherein the first substrate further comprises a second insulating layer which is in contact with the second upper surface and the third upper surface, and an alignment film which is in contact with the second insulating layer and the end portion.

18. The display device of claim 17, wherein:
the first substrate further comprises a common electrode which is in contact with the first upper surface, and is covered with the alignment film; and
the common electrode is not in contact with both of the second upper surface and the third upper surface.

19. The display device of claim 18, further comprising a liquid crystal layer interposed between the sub-spacer and the alignment film.

* * * * *